Figure 1:
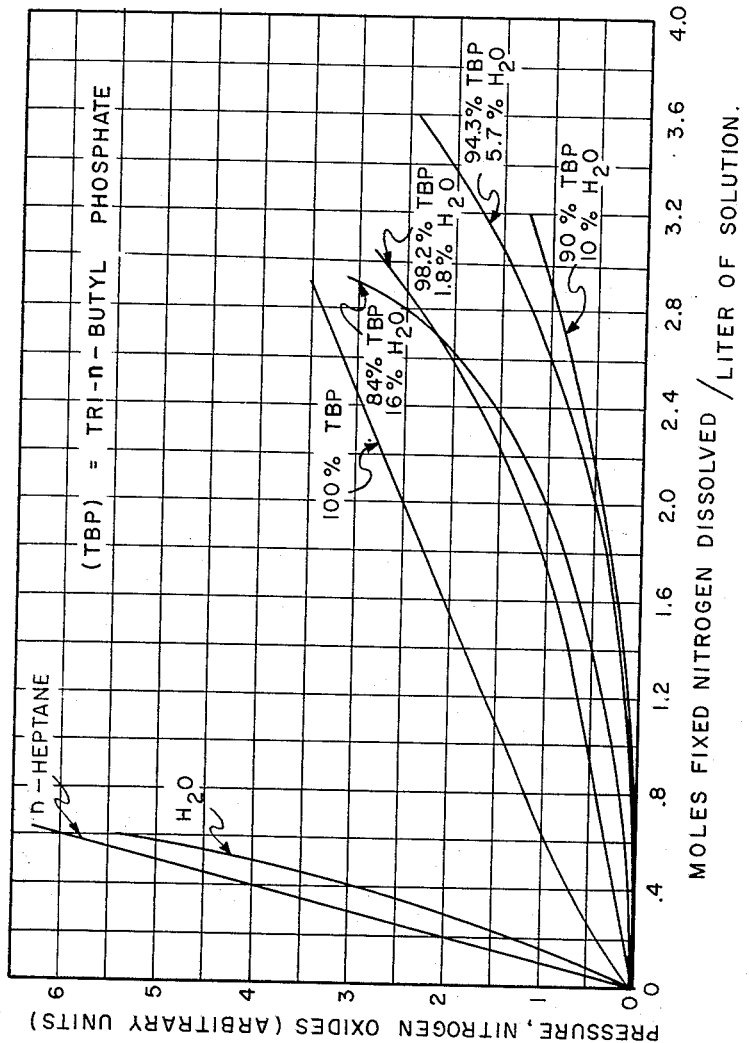
Figure 2:
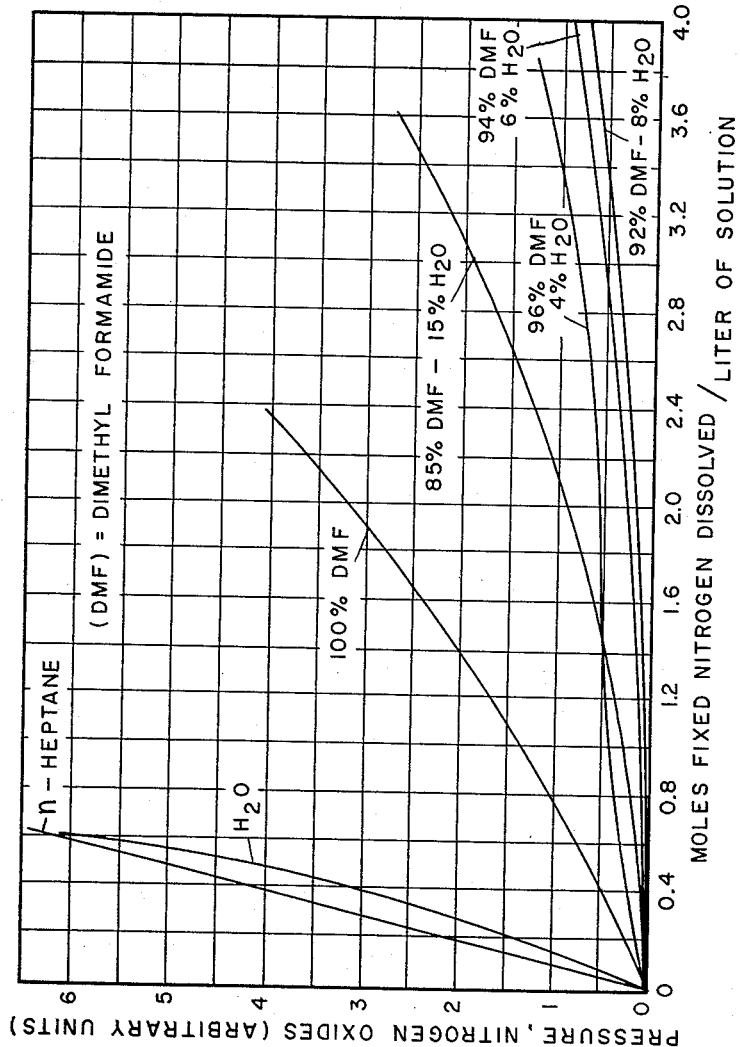
Figure 3:
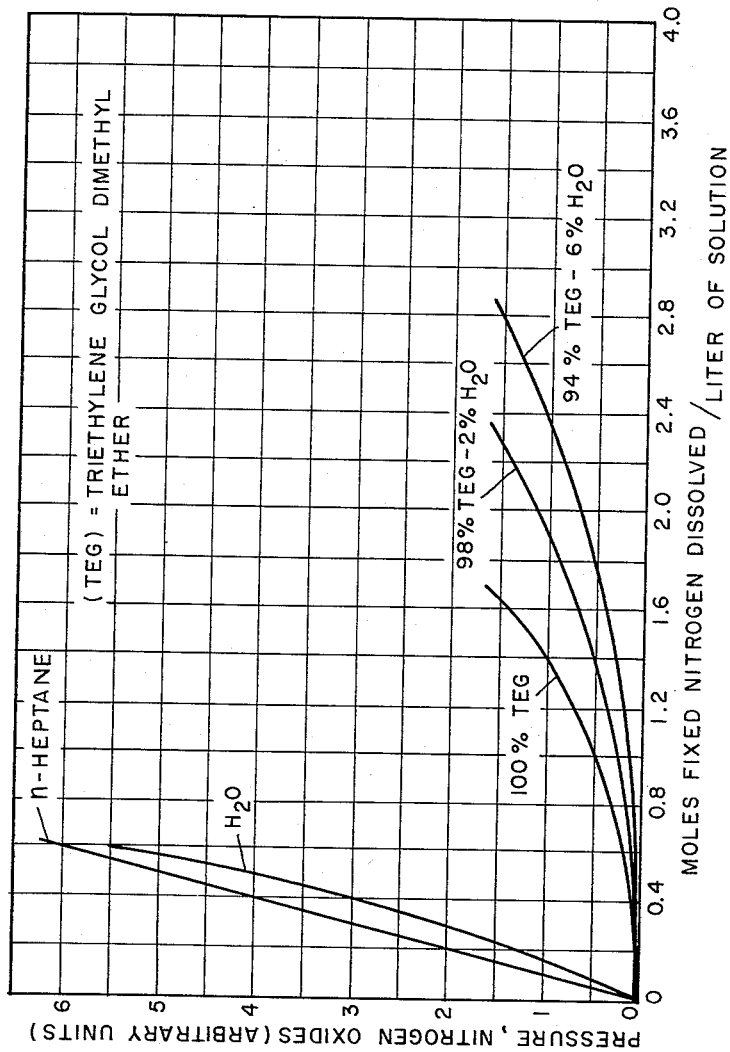
Figure 4:
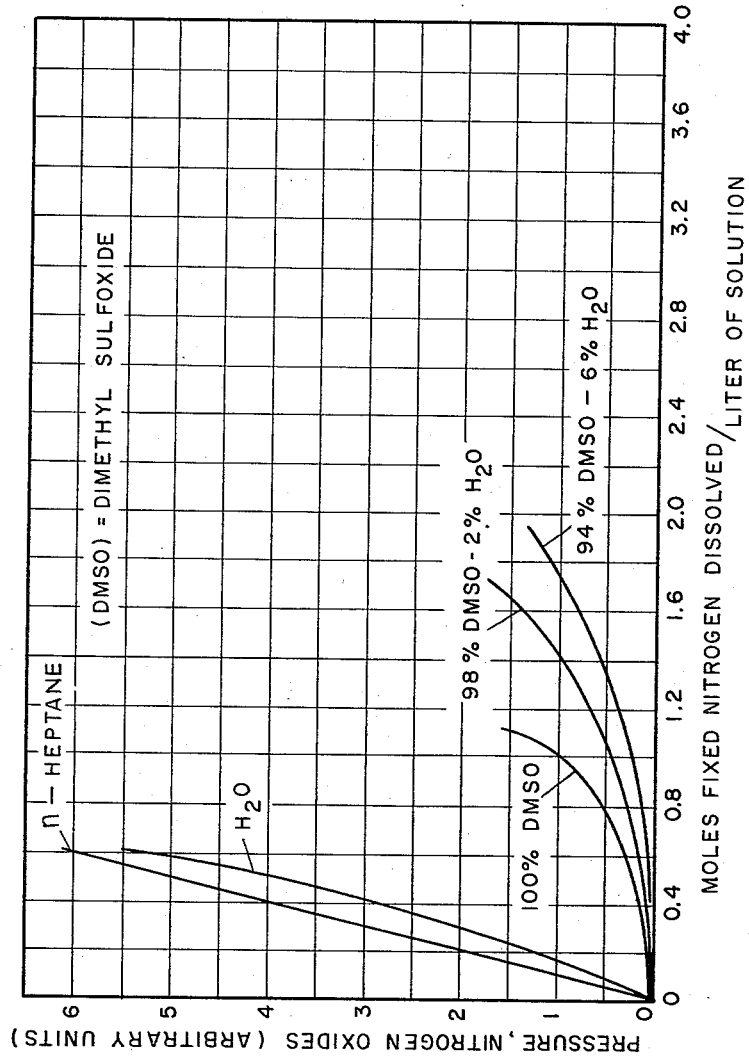
Figure 5:
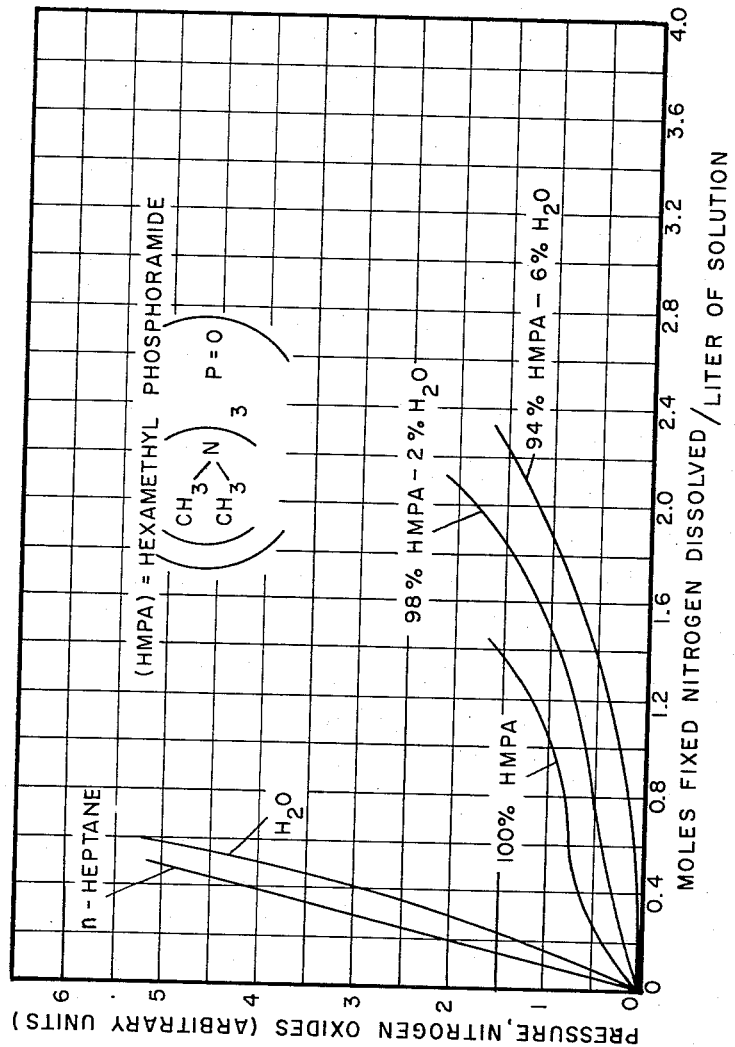

LUCIEN G. MAURY,
GEORGE F. NAHILL.
INVENTORS

BY Ernest G. Peterson

AGENT.

United States Patent Office 3,044,844
Patented July 17, 1962

3,044,844
METHOD OF REMOVING NITROGEN OXIDES FROM FLUIDS AND NITROUS ACID
Lucien G. Maury, Newark, and George F. Nahill, Wilmington, Del., assignors to Hercules Powder Company, Wilmington, Del., a corporation of Delaware
Filed May 29, 1958, Ser. No. 738,717
17 Claims. (Cl. 23—2)

This invention relates to the removal of nitrogen oxides and nitrous acid from fluids containing same by selective action of an electron donor compound, and to resulting solvated compositions. In one aspect, this invention relates to a method for the removal of residual nitrogen oxides from gases containing same by absorption by an electron donor compound. In still another aspect, this invention relates to a method for concentrating fixed nitrogen components, initially present in a gas stream, for further reaction, by selective absorption in an electron donor solvent, and subsequently reacting the absorbed component. In another aspect, this invention relates to the utilization of an electron donor absorption system in ammonia oxidation and nitrogen fixation processes whereby efficient recoveries of fixed nitrogen product are effected with accompanying reduction in time and equipment requirements therefor. In still another aspect, this invention relates to a method for maintaining nitrous acid for reaction, in molecular form, in higher concentrations than have been heretofore possible.

In the processing of nitrogen compounds, nitrogen oxide and/or nitrous acid-containing streams are often formed. In most instances, the nitrogen oxide and/or nitrous acid components must be separated from the other components of the stream for further processing, or for subsequent processing or handling of the stream. Illustrative of such processes are ammonia oxidation to produce nitrogen oxides, and ultimately, nitric acid; nitrogen fixation processes involving reaction of the nitrogen and oxygen components of air to form nitrogen oxides and ultimately nitric acid or salts thereof; nitration of aliphatic and aromatic hydrocarbons, alcohols and the like; nitration of cellulose; metal or ore treating processes; sulfuric acid manufacture employing the lead chamber process; and the like.

In the oxidation of ammonia, the ammonia is oxidized with air at temperatures up to 1100° C. and higher to form nitrogen oxides which are then fed to a water absorption system to react the oxide product with water and oxygen to form nitric acid. In conventional processes for the fixation of nitrogen, nitrogen oxides are formed by reacting nitrogen and oxygen components of air at 2000–3500° C., and higher, followed by sudden cooling to about 1200° C. In most cellulose nitration processes, cellulose in fibrous form is nitrated at 15–70° C. employing any of the suitable mixed acids therefor, such as any of various mixtures of nitric acid, sulfuric acid, and water.

In the ammonia oxidation and nitrogen fixation processes the ultimately formed nitrogen-containing compound is recovered for subsequent reaction to the desired product. In the cellulose nitration processes, as in the case of others above named, although certain by-product streams are advantageously returned to the system for utilization, there is ultimately produced a residual stream that is discharged from the system, generally directly to the atmosphere, which contains low concentrations of nitrogen oxides, i.e., in the order of from about 0.1 to 0.6 volume percent. These oxides, due to the high state of dilution involved, have been removed only with great difficulty and, in many instances, their removal has not been accomplished. Accordingly, there has necessarily been a discharge of such streams to the atmosphere, as waste gas, with accompanying pollution problems that arise from the residual nitrogen oxide components.

Various methods have been advanced for the separation of nitrogen oxides from streams of the kind hereinabove discussed. Thus, in the recovery of nitrogen oxides from a process stream for ultimate conversion to product such as nitric acid, as is the case of product streams from ammonia oxidation and nitrogen fixation processes, removal of the oxides has been carried out by water absorption. Although other solvents can be utilized under certain circumstances, water for this purpose has been generally accepted as the most desirable solvent. Silica gel and other selective materials have been utilized to a limited extent as removal agents for oxide product in such streams. Other methods have involved absorption of the oxides in an aqueous base, or in concentrated sulfuric acid, and absorption in halogenated solvents.

In the water absorption method, the most widely used, the absorption has required a relatively high nitrogen oxide pressure for efficient operation, the chief reaction involving that of nitrogen dioxide with water and oxygen to form nitric acid. Because only nitrogen dioxide can be dissolved in water, it is necessary that the nitric oxide be oxidized to $NO_2$, which offers some difficulty in effecting removal of the NO component. Although water can be used at lower pressures, the rate of absorption is so low and the equilibrium is so unfavorable as to require excessively high time and/or equipment requirements in order to provide the necessary capacity in any given situation. Absorption of nitrogen oxides on silica gel demands that the nitrogen oxide-containing gas be dry. Dehydration of these gases is time consuming and uneconomical. Further, the silica must be dried, cooled and heated in each cycle of the process.

In the absorption of oxides from residual streams, e.g., waste gas streams of the type above discussed, absorption of the oxides in an aqueous base to form a salt is undesirable both from the standpoint of low value of the salts produced and also the low rate of the reaction involved. Sulfuric acid absorption is disadvantageous particularly inasmuch as water, invariably present when the gas is treated, causes deconcentration of the acid which in view of need for reconcentration poses a question of economics. Halogenated solvents also exhibit low solvent power and are in most instances uneconomical.

This invention is concerned with a method for the removal of nitrogen oxides and/or nitrous acid from fluids containing same wherein the efficiency of removal is markedly improved over that of prior art methods, and with new solvated compositions. The invention is also concerned with a method for obtaining molecular nitrous acid in solution in a markedly higher concentration than has been possible heretofore whereby it is possible to react nitrous acid as a separate reagent.

An object of this invention is to provide for the removal of nitrogen oxides and nitrous acid from fluids containing same by selective absorption in an electron donor compound. Another object is to provide for the separation of nitrogen oxides from gases containing same by the selective action of electron donor solvents. Another object is to provide for the utilization of electron donor compounds alone or supplemented by critical proportions of water in the removal of nitrogen oxides from fluid streams containing same. Another object is to provide for nitrous acid in molecular form in concentrations higher than have been possible heretofore. Another object is to provide for the removal of nitrogen oxides from gases containing same in a high state of dilution. Another object is to provide for improved product recovery from ammonia oxidation and nitrogen fixation processes. Still another object is to provide an improved process for the manufacture of nitrogen acids, utilizing ammonia oxidation or direct fixation of nitrogen, wherein time and process requirements for fixed nitrogen recovery are lowered and equipment requirements are less than heretofore. Other objects and aspects will be apparent in light of the accompanying disclosure and the appended claims.

In accordance with the invention, an improvement is provided in a process for the separation of nitrogen-containing compounds of the group consisting of nitrous acid, nitric oxide, nitrogen dioxide, nitrogen trioxide, nitrogen tetroxide, and nitrogen pentoxide, from fluids containing same, which comprises contacting the said fluid with an electron donor compound as a selective absorption agent for said nitrogen-containing compounds so as to effect absorption of same by said donor compound, said donor compound being chemically reactive with said nitrogen oxides and said nitrous acid only by sharing electrons, or forming species similar to "charge transfer compounds" therewith, and also exhibiting selective solvent action for acetylene. It is a feature of the invention that a still more efficient absorption of nitrogen oxide and nitrous acid is achieved when water is present in the donor compound in controlled proportions, as discussed hereinafter.

The absorption efficiency of the present process is markedly higher than that of the prior art employing water or an organic nonelectron donor type absorption medium or mixtures of the two. Thus, the equilibrium nitrogen oxide vapor pressure of an electron donor solvent solution of nitrogen oxides is markedly lower than that of the same concentration of nitrogen oxides dissolved in nonelectron donating solvents. If water is added to the donor-oxide solution, the vapor pressure is decreased to a still lower value.

The high absorption efficiency of the process of the invention is believed attributable to more than a physical solution of the oxide or nitrous acid in the solvent. It appears that the vapor pressure of nitrogen oxides over the donor solvent is reduced due to a solvation involving the oxide and solvent to form the solvated ions $NO^+$, $NO_2^-$ and $NO_3^-$ in the case of an anhydrous solution, whereas in the presence of water, it appears that the solvated ions are converted to solvated nitrous acid and nitric acid. Probably the solvated nitrogen-containing compounds contain one mole of solvent per mole of fixed nitrogen.

The function of the water, so far as the improvement of the absorption efficiency is concerned appears to involve reaction of the solvated ions to form solvated nitrous and/or solvated nitric acid thereby moving the position of the equilibrium between nitrogen oxides and the solvated species away from the nitrogen oxides, the result being concomitantly lower vapor pressure of the nitrogen oxides.

With reference to FIGURES 1–5 are shown a set of curves illustrative of the improved absorption of the invention. FIGURES 1–5 are plots of data obtained from the absorption of fixed nitrogen (nitrogen oxides) from several gas streams containing equivolume proportions of nitric oxide and nitrogen dioxide in various absorption solvents including water, normal heptane, and electron donor solvents. Each absorption was carried out at ambient temperatures in the order of about 20–30° C., at atmospheric pressure and under the solvent conditions shown. As apparent from each of the FIGURES 1–5, the electron donor curves are markedly more shallow than those representing tests utilizing nonelectron donor solvents, indicating thereby the improved efficiency of absorption obtained over prior art methods.

Thus, FIGURE 1, illustrative of tri-n-butyl phosphate at a nitrogen oxide pressure of "2," contains about 1.55 moles of fixed nitrogen dissolved per liter of solution as compared with 0.2 mole when n-heptane is used as the selective solvent and as further compared with 0.3 mole when water is utilized as the solvent. As shown, therefore, tri-n-butyl phosphate, an electron donor, is a markedly more efficient solvent for nitrogen oxides, in the practice of the invention than water and than n-heptane, which are nondonor solvents. FIGURE 1 further illustrates the added absorption efficiency achieved when water is present in the solvent. Thus, when 1.8 weight percent water is present in the tri-n-butyl phosphate, the moles of dissolved fixed nitrogen is increased to about 2.6, and in the presence of 5.7 weight percent water the said value is increased to almost 3.4.

Similarly, the curves of FIGURES 2–5 demonstrate respectively the efficiency of absorption obtained employing dimethyl formamide, triethylene glycol dimethyl ether, dimethyl sulfoxide and hexamethyl phosphoramide, alone and in the presence of water. These compounds, together with tri-n-butyl phosphate, are preferred donor absorption compounds in view of the ease with which water concentration therein can be controlled by presence of a solvent-miscible-water immiscible diluent, as described hereinafter.

Figure 6:
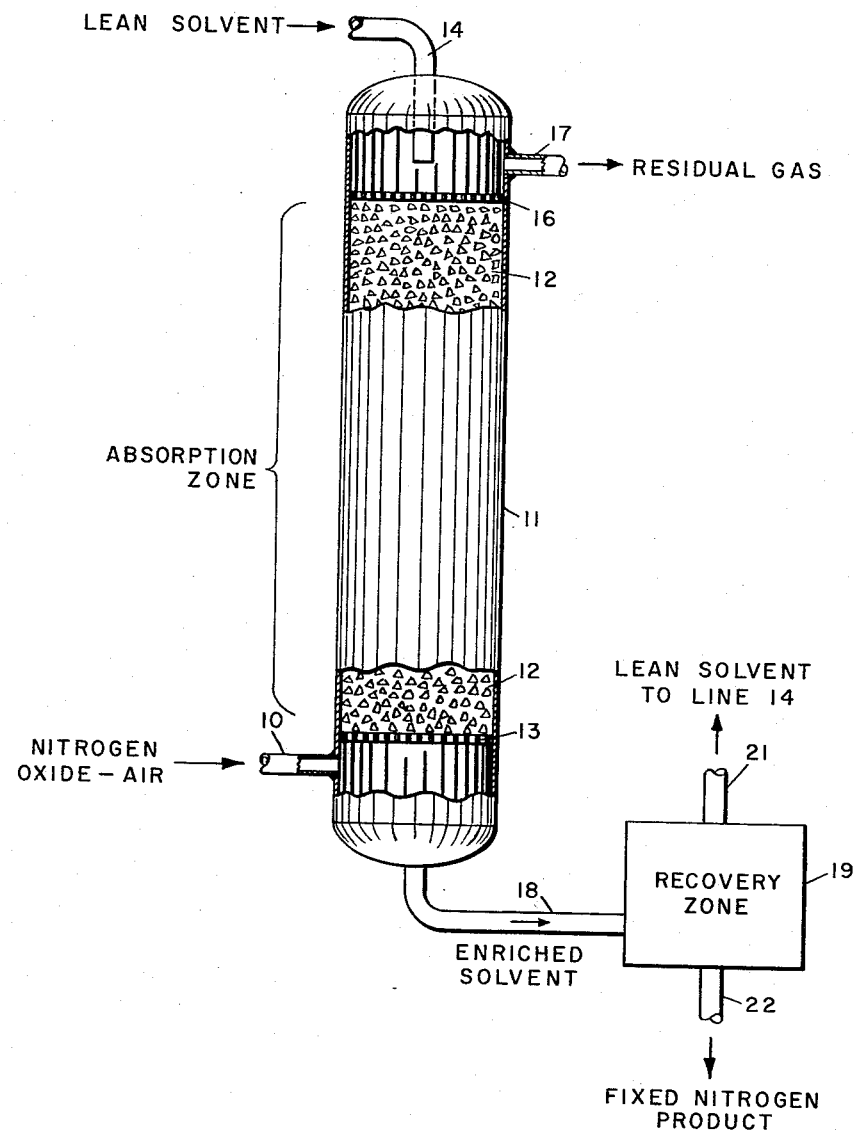

The invention is further illustrated with reference to FIGURE 6, which is a diagrammatic flow sheet of a now-preferred process embodiment. Referring to FIGURE 6, a nitrogen oxide-air mixture such as effluent from an ammonia oxidation system or a nitrogen fixation process containing from about 2 to about 10 volume percent nitrogen oxides of an average oxidation state of say 3.1 to 4.7, is passed via line 10 into chamber 11 at a point in a lower portion thereof below packing 12 supported on perforate plate 13, and upwardly therethrough in countercurrent contact with an electron donor solvent of the invention flowing downwardly over the surfaces of the packing 12 and introduced into an upper portion of chamber 11 via line 14. Liquid solvent from line 14 is distributed in contact with packing 12 through distributor member 16. Residual gas from chamber 11 is discharged via line 17. Solvent from line 14 preferably contains a sufficient amount of water to impart increased absorption efficiency as described hereinafter. Solvent, enriched in fixed nitrogen, is withdrawn from chamber 11 via line 18 and passed to recovery zone 19 wherein solvent and fixed nitrogen are separated and from which lean solvent is recycled via line 21 to line 14. Fixed nitrogen recovered from zone 19 is withdrawn via line 22. Any suitable recovery step can be utilized in separation zone 19. Thus, the nitrogen oxides can be recovered by extraction with aqueous base, steam distillation, or distillation at temperatures below decomposition temperatures of the donor solvent present.

In view of the presence of water in the solvent, nitrous acid is formed and is present in the solvent as the predominant form of fixed nitrogen product. Thus, aqueous base extraction, in that instance, will produce largely a nitrite as fixed nitrogen product. However, a preferred method for the separation of fixed nitrogen compounds from the gases in zone 19 involves a combined oxidation and reaction of water with the oxides and nitrous acid so produced to form nitric acid as aqueous $HNO_3$ or alternatively to form nitric acid which can be reacted directly in the solvent such as by neutralization of ammonia to form ammonium nitrate. The preferred recovery step is disclosed and claimed in our copending application, Serial No. 738,813, filed May 29, 1958.

The invention is illustrated with further reference to FIGURE 6 and to Table 1 following. An absorption column of FIGURE 6 was packed with ¼ inch Heligrid type packing supported on a steel screen containing 0.1 inch openings. Three ceramic dispersing plates were placed directly above the packing to serve as a distributor member for liquid to be passed downwardly through the packing. The column was 10 cm. I.D. x 70 cm. in length, of which 55 cm. contained the above described packing, the total packed volume being 0.1535 cubic foot. A gas feed stream containing nitric oxide and nitrogen dioxide was fed into the absorption column at a point below the steel packing support and passed upwardly through the packing in countercurrent flow relation with lean liquid solvent, tri-n-butyl phosphate-water, fed into the column at a point above the distributor plate. The absorption was conducted at atmospheric pressure and at ambient temperatures which were in the order of about 22–27° C. Residual gas was withdrawn from the column at a point above the distributor plate without interruption of influent flow of liquid solvent to the column. Enriched liquid solvent was withdrawn at a point below the packing support without interruption of influent gas flow to the column. Each run was of one hour duration plus a prerun duration for effecting steady state conditions.

The data demonstrate selective absorption efficiencies of 85 to substantially 100 percent, even when the fixed nitrogen content of the feed gas is as low as 0.2 volume percent.

The efficiency values shown in Table 1, particularly those of run numbers 1–4, can be markedly increased by employing an increased ratio of liquid solvent to gas contacted therewith and also by conducting the absorption under increased total pressure. Thus, by way of further example, the ease and efficiency of absorption of fixed nitrogen from the feed stream of run number 1 containing 0.2 volume percent nitrogen oxide is about the same at 4 atmospheres as that of a stream of 0.8 volume percent fixed nitrogen (run number 5) at one atmosphere. Thus, run number 1, if the overall absorption pressure had been Table 1 [1]

| Run No. | A | | | | | B | | | | C | | | | |
|---|---|---|---|---|---|---|---|---|---|---|---|---|---|---|
| | Gas Feed | | | | | Gas Effluent | | | | Lean Solvent | | | | |
| | $N_2$ | $O_2$ | $NO_2$ | NO | Total | $N_2$ | $O_2$ | NO | Total | TBP [2] | Oil [3] | $H_2O$ | $HNO_3$ | Total |
| 1 | 23.25 | 0.0 | 0.0365 | 0.0238 | 23.31 | 23.25 | 0.0 | 0.0095 | 23.26 | 2.60 | 2.40 | 0.169 | 0.050 | 5.22 |
| 2 | 17.85 | 5.40 | 0.0365 | 0.0238 | 23.31 | 17.85 | 5.39 | 0.0095 | 23.25 | 2.05 | 1.86 | .137 | 0.040 | 4.09 |
| 3 | 22.35 | 0.0 | 0.0230 | 0.0475 | 22.42 | 22.35 | 0.0 | 0.0095 | 22.36 | 3.35 | 2.05 | .223 | 0.060 | 6.68 |
| 4 | 17.15 | 5.20 | 0.0730 | 0.0475 | 22.47 | 17.15 | 5.18 | 0.0095 | 22.34 | 2.50 | 2.30 | .167 | 0.0475 | 5.02 |
| 5 | 23.33 | 0.0 | 0.146 | 0.095 | 23.58 | 23.33 | 0.0 | 0.0095 | 23.34 | 4.21 | 3.86 | .230 | 0.082 | 8.38 |
| 6 | 17.15 | 5.18 | 0.146 | 0.095 | 22.58 | 17.15 | 5.15 | 0.0095 | 22.31 | 3.09 | 2.83 | .210 | 0.060 | 6.19 |
| 7 | 20.60 | 0.0 | 1.46 | 0.95 | 23.01 | 20.60 | 0.0 | 0.0095 | 20.61 | 12.28 | 11.26 | .820 | 0.24 | 24.60 |
| 8 | 15.80 | 4.80 | 1.46 | 0.95 | 23.01 | 15.80 | 4.60 | 0.0095 | 20.41 | 12.28 | 11.26 | .820 | 0.24 | 24.60 |

| Run No. | D | | | | | | E | |
|---|---|---|---|---|---|---|---|---|
| | Enriched Solvent | | | | | | Percent Fixed Nitrogen In Feed | Absorption Efficiency, Percent |
| | TBP [2] | Oil [3] | $H_2O$ | $HNO_3$ | $HNO_2$ | Total | | |
| 1 | 2.60 | 2.40 | 0.16 | 0.060 | 0.050 | 5.27 | 0.20 | 85 |
| 2 | 2.05 | 1.86 | 0.13 | 0.067 | 0.039 | 4.15 | 0.20 | 85 |
| 3 | 3.35 | 3.05 | 0.20 | 0.070 | 0.127 | 6.80 | 0.40 | 92 |
| 4 | 2.50 | 2.30 | 0.142 | 0.100 | 0.095 | 5.14 | 0.40 | 92 |
| 5 | 4.21 | 3.86 | 0.23 | 0.092 | 0.276 | 8.67 | 0.80 | 96 |
| 6 | 3.09 | 2.83 | 0.15 | 0.163 | 0.207 | 6.44 | 0.80 | 960 |
| 7 | 12.28 | 11.26 | 0.27 | 0.25 | 2.96 | 27.02 | 8.0 | 99.5 |
| 8 | 12.28 | 11.26 | 0.27 | 1.24 | 2.22 | 27.27 | 8.0 | 99.5 |

[1] All values, columns A, B, C, D, reported as pounds per hour.
[2] Tri-n-butyl phosphate.
[3] No. 2 hydrocarbon oil (olefin free).

Each of both the influent and effluent gas streams was analyzed for $NO_2$ and NO at five minute intervals, by ultraviolet analysis. The content of the remaining components in each of the influent and effluent gas streams was determined by conventional methods and is shown in Table 1, in terms of pounds per hour of flow together with the average value of the nitrogen oxide content observed. Throughout each run, the concentration of nitrogen oxides in both gas streams were constant within the accuracy of measurement which was about ±0.001 atmospheres pressure of both nitric oxide and nitrogen dioxide. The influent lean liquid was made up specifically for these runs, the composition in each instance being recorded in Table 1 under column C. Effluent liquid, i.e., enriched solvent, was analyzed after each run for nitrous acid and nitric acid. In carrying out the analysis of enriched solvent for nitrous and nitric acid, total acidity in the organic phase was determined by titrating an aqueous suspension with standard base. Nitrous acid was determined by dissolving a known amount of the organic phase in ethanol, coupling the nitrous acid with sulfanilic acid or one of its derivatives and measuring the spectrophotometric absorption of the resulting colored solution in the visible region. Nitric acid content was obtained by subtracting nitrous acid content from the total acid. The enriched liquid solvent composition for each run is shown under column D in Table 1.

about 4 atmospheres, would have been characterized by an absorption efficiency of about 96 percent.

Figure 7:
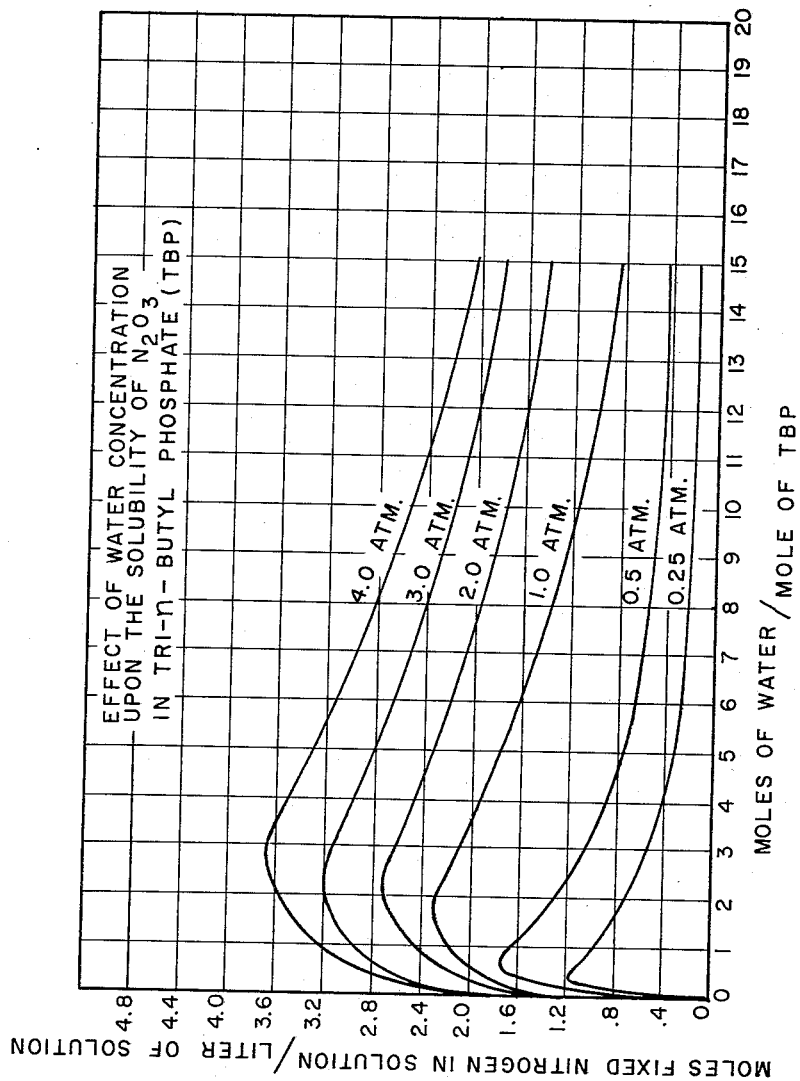

FIGURE 7 is illustrative of optimum water concentrations for absorption efficiency at different nitrogen oxide pressures, with reference to absorption of nitrogen trioxide in tri-n-butyl phosphate. It is to be noted that, particularly at lower nitrogen oxide pressures, it is less important to maintain the optimum water concentration and it is most practical, from the standpoint of control, to maintain the water concentration in excess of the optimum value because, as shown with reference to FIGURE 7, the slope of the curve relating vapor pressure of nitrogen oxides to water concentration in the solvent is much less at water concentrations above the optimum than below it.

When referring to electron donor compounds herein, it is meant compounds that possess a least one unshared pair of electrons which can become attached to a molecule capable of accepting an electron pair. Many electron donor-acceptor pairs are known, the donor-acceptor combination being referred to either as a complex or a solvation. The latter term is that applicable to those bonds of the process of this invention which are "weak" or "loose," and can be broken under conventional product recovery means described herein for separation and recovery of fixed nitrogen from the enriched solvent.

The electron donor compounds employed in the practice of the invention are those which are chemically reactive with the nitrogen oxide component of the fluid treated, only to the extent of sharing electrons therewith and which also share electrons with acetylene to thereby function as selective solvents for acetylene.

Electron donor solvents suitable for sharing electrons with acetylene to form a resulting bond with acetylene are described in General Papers Presented Before the Division of Petroleum Chemistry of the American Chemical Society, No. 31, March 29 to April 1, 1954, Kansas City, Missouri.

Exemplary electron donor compounds employed in the practice of this invention alone, or in the presence of water are: trialkyl phosphates, e.g., tributyl phosphate, triethylphosphate, and tri-2-ethylhexyl phosphate; dialkyl acid phosphates, e.g., diethyl acid phosphate and dilauryl acid phosphate; mixed dialkyl, monoalkyl phosphates, e.g., the mixture of mono- and di-lauryl acid phosphates; triaryl phosphates, e.g., triphenyl phosphate, tricresyl phosphate; diaryl, monoaryl and mixed mono- and diaryl phosphates, e.g., mixtures of mono- and di-phenyl acid phosphates; nitriles, e.g., benzonitrile, stearyl nitrile, adiponitrile, amides, e.g., dimethylformamide, dimethylbenzamide, methyl nonamide; ethers, preferably cyclic ethers and ethers containing more than one ether linkage, e.g., dioxane, tetrahydrofuran, triethyleneglycol dimethyl ether, ethylene glycol dimethyl ether, and Carbowax (trade name for a number of polyethylene glycol ethers of various molecular weights); sulfoxides, e.g., dimethylsulfoxide and diethylsulfoxide; certain acetals, e.g., dimethyl acetals compounds containing two or more of the functional groups mentioned above such as hexamethyl phosphoramide, ethyl ether of 2-hydroxyacetonitrile; organic acids, e.g., acetic acid; esters of organic acids, e.g., ethyl acetate; and certain ketones and aldehydes.

As above stated, the electron donor solvents employed in the practice of the invention are those which are reactive with the fixed nitrogen only to the extent that they share electrons therewith and which are selective absorbents for acetylene. Accordingly, those electron donors which share electrons with acetylene to thereby function as a selective solvent therefor but which are reactive with the nitrogen oxide and/or nitrous acid other than by sharing electrons therewith, as described, are outside the scope of the invention. Illustrative of such electron donor compounds outside the scope of the invention are: dimethylurea, urea, acetaldehyde, methylal, acetone, glyoxol tetramethyl acetal, diethyl oxalate dimethyl acetal, acetal, trimethyl amine, dimethyl amine, monomethyl amine, butyrolactam, propionaldehyde and furfural.

When employing water as a component of the solvent, the fixed nitrogen is, to a large extent, in form of "solvated" nitrous or nitric acid in which form it is the most strongly absorbed of the various solvated species. The proportion of fixed nitrogen held as solvated nitrous acid increases with increased concentration of electron donor and water, and with a concomitant reduction in vapor pressure of the fixed nitrogen. This is in accord with the curves of FIGURES 1–5, which show that the addition of water decreases the vapor pressure of fixed nitrogen over these solutions.

Although the optimum water concentration depends upon several factors, particularly the oxidation state of the fixed nitrogen, the concentration of fixed nitrogen in the solution, and concentration of electron donor in the solution, the water concentration most often will be in the range of 2–20 moles of water per mole of nitrous acid in the solution, and the molor ratio of electron donor to water will generally be in the range of about 0.1:1 to 10:1, preferably 0.4:1 to 3:1.

The optimum water concentration for a given system can be determined in any suitable manner. Thus, with a constant number of moles of nitrogen oxide and/or nitrous acid in the resulting solvent solution, increments of water can be added to the solution and the solution vapor pressure measured. At the various increment values, the solution vapor pressure is plotted versus mole ratio of water to solvent. The resulting curve contains a minimum from which optimum water concentration is read. The optimum water concentration can also be determined by a plot of the kind illustrated with reference to FIGURE 7, the optimum water concentration value being read from the crest of the resulting curve.

It is not necessary that the water content be controlled to the optimum (crest or trough) values described above in order to achieve marked improvement in absorption efficiency, inasmuch as improved absorption efficiency, although lesser in degree, is achieved on either side of the said optimum value. However, from the standpoint of practicability we prefer to employ a water content greater than the said optimum value inasmuch as the curves, as illustrated with reference to FIGURE 7, are much more shallow on the high water concentration side so that the control of water concentration for accomplishing a given absorption efficiency along that portion of the curve is less exacting than would be the case in attempting to maintain the requisite water concentration on the low water concentration side. It is, therefore, the purpose of this invention to utilize a sufficient amount of water whether on the low or high side of the crest or trough value described, to impart improved absorption efficiency to the solvent. Generally a water concentration up to from 100–150 percent in excess of that for maximum absorption efficiency, i.e., as measured at the above described crest or trough curve portion, is employed. Higher values than about 150 percent generally result in an improvement in absorption efficiency of so small a degree that they are seldom utilized. When the water concentration is sufficiently high, dependent upon the system, there results a decrease in absorption efficiency, as illustrated to FIGURES 1 and 2. However, most often, a concentration of 2–25 weight percent water, in the donor solvent, is suitable in the practice of the invention.

In the utilization of a water immiscible diluent to regulate water concentration in the solvent, we find it advantageous to employ as the donor solvent one which is only partially miscible with water and to regulate water concentration by the presence of an amount of diluent which limits the water concentration at water saturation to the desired level, and then employing the water saturated solvent as the selective solvent. By way of illustration, a water saturated solution of tri-n-butyl phosphate contains 3.2 moles per liter of water at about 25° C. but by dilution with an equal volume of kerosene, the water concentration in the water saturated solution is thereby regulated to 0.86 mole per liter.

The degree of dilution is, based upon the volume ratio of donor solvent to diluent, within the range of 0.2:1 to 5:1, although values outside that range can be employed depending upon the solvent utilized and the composition of the gas treated.

When utilizing a partially water miscible donor solvent in accordance with the foregoing embodiment, the solubility of water in the donor solvent is preferably in the above described order of about 2–25 weight percent.

The water contcentration of the donor solvent requires replenishing, as the absorption proceeds, due to its reaction involving formation of nitrous acid, which as it now appears, may be in accordance with the following equation, $N_2O_3$ being illustrative:

$$N_2O_3 + S:H_2O = 2S.HNO_2$$

Diluent can also be used in the practice of the invention in order to facilitate contact of the donor and fluid. Thus, when absorbing nitrogen oxides from very dilute gas streams, it is difficult to contact the very small required amount of electron donor with the large gas volume to absorb the nitrogen oxides, the amount required being small in view of the large capacity of the electron donor for absorption of the fixed nitrogen.

Exemplary diluents, employed in the practice of the invention, are hydrocarbon liquids such as kerosene, gas oils and the like, saturated fuel oils, halogenated hydrocarbons, aromatic hydrocarbons and halogenated aromatics, nitroaromatic and aliphatic compounds, aromatic ethers (e.g., Dowtherm—a eutectic mixture of diphenylether and diphenyl) and various donor solevnts themselves.

Although diluents, in the practice of the invention are generally nonelectron donors, various suitable electron donor solvents can be so employed, the essential characteristic being that the said solvent, as a diluent, is to a significant extent immiscible with water such that the resulting diluent solvent will dissolve no more than about 25 weight percent water. Of course, it is required that the donor compound, as a diluent, be miscible with the electron donor solvent employed in conjunction therewith. To the extent that a donor compound functions as a diluent, it will, due generally to its partial miscibility with water, be employed in a concentration higher than that utilized for nondonor diluents of very limited water solubility. The proportions of donor diluent and donor solvent depend upon the specific pair of liquids employed. Thus, dioxane as a donor solvent is highly water miscible and tributylphosphate as a donor solvent exhibits a relatively low water miscibility but is highly soluble in dioxane, and suitably serves as a diluent to regulate water concentration therein, say to a value within a range of about 10 to 35 weight percent when employing about 50 to 75 weight percent of the donor diluent liquid.

Although we have found the invention advantageously applied to removal of nitrogen oxides and nitrous acid from gases, it is also within the scope of the invention to remove dissolved nitrogen oxides or nitrous acid from liquids. Thus, the invention can be advantageously applied to remove dissolved oxides from the aqueous nitric acid product of a conventional nitric acid plant process or from liquid solutions used in various nitration and oxidation processes, e.g., cellulose nitration, nitration of aromatic hydrocarbons, nitric acid oxidation of p-xylene, and the like. For example, the 60 weight percent nitric acid formed in the high pressure absorber of an ammonia oxidation plant contains from 1–3 percent dissolved nitrogen oxides. These nitrogen oxides have in the past been removed by sparging a stripping gas through the nitric acid solution. However, in the practice of this invention, the nitrogen oxide-containing nitric acid can be directly contacted with the donor solvent so that the nitrogen oxides are quantitatively dissolved into the donor solvent phase. The aqueous nitric solution leaving the zone of contact with the donor contains less than 0.04 volume percent nitrogen oxides, is water white, and does not discolor upon standing in the air.

We have found that pure nitric oxide is not absorbed by electron donor-water solutions or by anhydrous electron donors. However, we can effect absorption of that fixed nitrogen by addition of nitric acid to the solution to react with the nitric oxide, and donor solvent in accordance with the following equation:

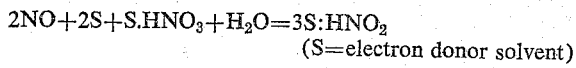

(S=electron donor solvent)

We have found that nitric oxide is absorbed into the donor from the gas stream contacted therewith, so long as the average oxidation state of the fixed nitrogen in the solution is at least 3.0. We prefer, therefore, to add nitric acid to the donor solution in order to maintain the minimum value at 3.0, in order to also accomplish removal of at least a major portion of the nitric oxide. However, the absorption rate is higher at the higher average oxidation state and we, therefore, prefer to carry out the process employing an oxidation state in the range of 3.1 to 4.7, preferably 3.5 to 4.5.

The optimum oxidation state, employing nitric acid as a regulator therefor, can be found in a given instance by dissolving nitrogen oxides in the absorbing solution and measuring the vapor pressure of the nitrogen oxides over the solution as increasing amounts of nitric acid are added to the solution. Thus, the results are plotted in terms of vapor pressure of nitrogen oxides vs. average oxidation state of the fixed nitrogen. The resulting curve contains a trough from which is read the range of oxidation state that gives minimum vapor pressure of nitrogen oxides and which is, therefore, to be utilized in achieving maximum efficiency of absorption.

It is within the scope of the invention to also utilize solid electron-donor solvents in the absorption of nitrogen oxides and/or nitrous acid from either gas or liquid streams. By way of illustration, a slurry of such a solid donor, e.g., triphenylphosphate, ground to pass 200 mesh is suspended in an aqueous solution by a gas stream flowing through the suspension, whereby nitrogen oxides are absorbed by the solid. Nitrogen oxides thus absorbed can be recovered from the solid by heating, extraction with a base, or by the oxidation technique described hereinabove wherein the oxides and nitrous acid are oxidized to nitric acid followed by recovery of nitric acid as such or in form of a salt.

The solid electron donor can also be utilized as a fixed bed by absorption of water on the solid absorbent and then passing the nitrogen oxide and/or nitrous acid-containing gas stream through the bed. The same equilibria apply whether the electron donor is solid or liquid.

When absorbing nitrogen oxide gases with donor solvent in the presence of water, nitrous acid in molecular form is obtained in solution in concentrations 100 times higher than the concentration of nitrous acid that can be maintained in nondonor solvents. The concentration of nitrous acid in an electron donor solution, that results from absorption of a nitrogen oxide, depends upon the specific electron donor and the water concentration therein. Thus, at a vapor pressure of "2.0" of FIGURE 1, a water solution contains 0.3 mole per liter of nitrous acid whereas a solution of 10 weight percent water and 90% tri-n-butyl phosphate contains about 4 moles of nitrous acid per liter. Other tri-n-butyl phosphate-water solutions contain up to 5 weight percent and higher of molecular nitrous acid. Depending upon the donor solvent utilized, solutions containing up to 10 moles of nitrous acid per liter can be obtained when carrying out a nitrogen oxide absorption at atmospheric pressure. By way of further comparison, solutions of nitrous acid in carbon tetrachloride, and n-heptane contain, at one atmosphere from about 0.02 to 0.1 mole of nitrous acid per liter.

In solutions of nitrous acid, of this invention, there appears to be an equilibrium relationship between nitrous acid and nitrosonium ion to the extent that solutions of fixed nitrogen are capable of undergoing reaction of either the nitrous acid or of the nitrosonium ion. It appears that whichever species is consumed in the reaction is instantly replenished from the other species by the equilibrium relating the two species.

Exemplary of reactions which the molecular nitrous acid in electron donor solution undergoes are diazotization of aromatic amines; nitrosation of secondary amines; diazotization in the para position of activated aromatics (e.g., phenol); formation of α-hydroxyimino ketones from ketones, oxidation of $HNO_2$; and formation of complex nitrites by reaction with aquated cobalt complexes.

The electron donor solutions of molecular nitrous acid of this invention are stable even in the presence of relatively high concentrations of acids, including strong mineral acids. Molecular nitrous acid-mineral acid solutions have not been previously attainable.

Illustrative of reactions involving use of solvated molecular nitrous acid of this invention is that of nitrous acid with phenol to form paranitrosophenol. The same reaction is known to proceed in an aqueous phase. The rate of reaction is greatly increased by increase in one or both of acidity and fixed nitrogen concentration, i.e., solvated nitrous acid. The donor solvent solution of nitrous acid, anhydrous or water-containing, is stable at such increased acidities, and therefore, when acidified and reacted with phenol to form paranitrosophenol does so at a proportionately increased rate. However, water solutions of nitrous acid are unstable at such acidities so that upon being acidified, the nitrous acid is decomposed liberating nitrogen oxide. Accordingly, aqueous nitrous acid cannot be acidified to react with phenol at a high rate to form paranitrosophenol. Further, the "solubility" of nitrous acid in the donor solvent is much higher than that in the aqueous medium to provide a much higher concentration of fixed nitrogen which, as above stated, results in a rate of reaction higher than possible when employing aqueous nitrous acid.

The number of moles of fixed nitrogen absorbed per mole of electron donor solvent varies generally within the range of 0.03:1 to 1:1 dependent upon the specific purpose of the absorption. Thus, the use of a high ratio of fixed nitrogen to electron donor compound will be particularly adaptable to operation wherein the specific objective is to form a concentrated solution of fixed nitrogen. Conversely the ratio of fixed nitrogen to electron donor compound will be relatively low when the objective is to decrease the concentration of fixed nitrogen in the effluent gas stream to a minimum. Other appropriate ratios of fixed nitrogen to electron donor solvent are selected accordingly.

The absorption process of the invention can be conducted over a broad range of temperature and pressure conditions. Thus, it is only necessary that the pressure be sufficiently high as to maintain the normally liquid donor solvent phase, and liquid feed when employed, in liquid state. However, operating pressures in the range of from 2 to 150 p.s.i.a. are generally utilized. If desired, the donor solvent and fixed nitrogen-containing gas can be initially contacted in vapor phase followed by liquefaction of the donor solvent to recover the fixed nitrogen. In any event, therefore, suitably high pressures for maintaining the donor solvent in liquid phase are employed during at least the later stages of the absorption. Temperatures are those above the freezing point of the normally liquid solvent phase, and fixed nitrogen stream when liquid, and below those at which the liquid components of the system are unstable. However, the absorption temperature employed will generally be in the range of from about 0° to 200° F. The following tabulation, with reference to several specific solvents, is illustrative of upper temperature limits, generally employed in the practice of invention.

| Electron Donor Solvent | Upper Temperature Limit, °C. | Preferred Upper Limit, °C. |
| --- | --- | --- |
| 1. Tri-n-butylphosphate | 150 | 100 |
| 2. Triphenylphosphate | 200 | 150 |
| 3. Dimethylformamide | 100 | 80 |
| 4. Dimethylsulfoxide | 60 | 50 |
| 5. Triethylene glycol dimethyl ether | 160 | 100 |
| 6. Dioxane | 70 | 40 |
| 7. Diethylene glycol dimethyl ether | 150 | 100 |
| 8. Tricresylphosphate | 150 | 100 |

The invention is advantageously applied to nitrogen oxide-containing by-product streams which can generally be referred to as waste gas streams inasmuch as the gas containing residual amounts of nitrogen oxides, e.g., less than about 1 percent, is directly discharged to the atmosphere, often introducing pollution problems. Thus, in the nitration of cellulose, residual gases contain from 0.3 to 0.6 volume percent nitrogen oxides with the remainder air. In view of the pollution problem often accompanying the discharge of these gases to the atmosphere, the art has endeavored to reduce the oxide content to below 0.1 volume percent. Water, as an absorbent, as well as other solvents of the art, has not been successfully utilized in view of the high state of dilution encountered. By way of a more specific example, a waste gas stream containing, on a volume basis, about 0.12 percent NO and 0.21 percent $NO_2$ and produced as a by-product stream of cellulose nitration was sparged through a two phase system of water and diluted tributyl phosphate at a rate of 2400 gas volumes per hour per volume of absorption liquid. The water content of the total liquid was about 16 weight percent. The scrubbed gas contained 0.03 volume percent NO and no $NO_2$ indicating thereby 91 percent of the oxides, not heretofore removable in accordance with prior art methods, to have been scrubbed out. The enriched tri-n-butyl phosphate solution contained about 1 mole fixed nitrogen per liter. Had water been used as a selective solvent, even under elevated pressure conditions, the maximum removal would have been markedly less, with concomitantly long time requirements making removal impracticable for commercial operation.

By way of further illustration of the invention, effluent from an ammonia oxidation conducted at 1000 to 1100° C. wherein a mixture of 9 to 10½ volume percent ammonia in air is oxidized to nitrogen oxides, and containing about 10 volume percent nitrogen oxides, is charged to a conventional water absorption system for recovery of the oxides by water absorption. An elevated pressure and minimum tower dimensions are required in order to provide sufficient capacity for the tower, say about 110 p.s.i.g. and a tower diameter of about 6.0 feet and a tower height of about 40 feet. If the same process is conducted at atmospheric pressure, about three such towers are required. If, in lieu of the water absorption, a tri-n-butyl phosphate-water absorption system is utilized, the pressure and equipment requirements are markedly lower. Thus, in a system utilizing tri-n-butyl phosphate as the selective solvent, at atmospheric pressure, the column diameter and height are about 2.0 and 25 feet respectively. The time for absorption is markedly less by the ratio of absorption tower sizes required in the two cases.

In the nitrogen fixation processes, which must be carried out at atmospheric pressure in view of the high temperatures required, the concentration of total nitrogen oxides in the effluent is generally in the order of from 2–3 volume percent or higher, very seldom, if ever, above 5 volume percent, due to the equilibrium characteristics of the direct fixation. In the recovery of such dilute fixed nitrogen employing water as a solvent, the oxidation state of the nitrogen must be high, it being necessary that the recovery be effected by absorption. Both the rate of oxidation of the nitric oxide and the absorption of the nitrogen dioxide are of second order and are very slow under these low concentration conditions. For these reasons, the recovery of fixed nitrogen from direct fixation processes has precluded commercial success of such operations.

The invention, in providing for the use of an elecron donor type solvent, in lieu of water, for the absorption of such highly dilute fixed nitrogen requires only that the oxidation state of the nitrogen be a minimum of three and, therefore, that the nitric oxide produced be oxidized only from valence two to three. Further, the absorption rate employing the electron donor solvent is much greater than that employing water.

In the use of silica gel as an absorbent in the recovery of fixed nitrogen from the direct fixation processes, numerous operating steps and high time requirements have been necessary. Thus, the gel and gas to be contacted therewith must be dry. The gel must be cool for the absorption but hot for desorption. Even though $NO_2$ is desorbed, the evolved $NO_2$ must be water absorbed for recovery with conventional practice. Residual silica gel is then moistened when removing the nitrogen oxides and subsequently heated to effect the desorption. The gel must then be cooled and finally dried prior to recycle.

The invention is, accordingly, advantageously applied in lieu of silica gel absorption inasmuch as it provides a single step absorption for removing in the order of from 80 to substantially 100 percent of the residual fixed nitrogen from the gas stream.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. A process for the removal of nitrogen-containing compounds from a gas containing a mixture of same selected from the group consisting of nitrous acid, nitric oxide, nitrogen dioxide, nitrogen trioxide, nitrogen tetroxide and nitrogen pentoxide, which comprises contacting said gas in countercurrent flow relation with a partially water-miscible liquid electron donor compound, containing from 2 to 25 weight percent water, at a temperature within the limits of about 0 to 200° F. and at an average oxidation state of total fixed nitrogen in the said mixture within the range of from 3.0 to 4.7, maintaining the rate of flow of each of said countercurrently flowing streams so as to enable said electron donor to absorb up to one mole of fixed nitrogen of said mixture of nitrogen compunds from said gas per mole of total electron donor present, maintaining said concentration of water in said donor compound by incorporating a liquid diluent therein which is miscible with said donor compound but substantially immiscible with water, said electron donor (1) being chemically reactive with each said nitrogen compound in said mixture only by sharing electrons therewith, (2) exhibiting selective solvent action for acetylene by sharing electrons therewith and (3) being selected from the group consisting of glycol ethers, alkyl phosphates, aryl phosphates, dialkyl amides, alkyl sulfoxides and alkyl phosphoramides, and recovering residual gas product substantially free from nitrogen-containing compounds of said mixture initially contained therein.

2. In a process for the removal of a nitrogen-containing compound from a fluid containing same and selected from the group consisting of nitrous acid, nitric oxide, nitrogen dioxide, nitrogen trioxide, nitrogen tetroxide, and nitrogen pentoxide, the improvement comprising contacting said fluid with an electron donor compound as a selective absorption agent for said nitrogen-containing compound therein so as to effect absorption of same by said electron donor, said electron donor being chemically reactive with said nitrogen-containing compound only by sharing electrons therewith and also exhibiting selective absorption action for acetylene by sharing electrons with said acetylene and being selected from the group consisting of glycol ethers, alkyl phosphates, aryl phosphates, dialkyl amides, alkyl sulfoxides and alkyl phosphoramides, contacting said fluid with said donor in the presence of water in a mole ratio of said donor to said water within the range of from 0.4:1 to 10:1, and when said fluid contains nitric oxide, maintaining the average oxidation state of the total fixed nitrogen, of the above said group of nitrogen-containing compounds, contained in said fluid, at least as high as 3.0.

3. A process of claim 2, wherein said electron donor compound is a solid.

4. A process of claim 1, wherein said electron donor compound is tri-n-butyl phosphate, the maximum contacting temperatures is 150° C., and the amount of said diluent is sufficient for maintaining said tributyl phosphate water saturated at the said water concentration.

5. A process of claim 2 wherein said donor compound is tri-n-butyl phosphate.

6. A process of claim 2 wherein said donor compound is dimethyl formamide.

7. A process of claim 2 wherein said donor compound is triethylene glycol dimethyl ether.

8. A process of claim 2 wherein said donor compound is dimethyl sulfoxide.

9. A process of claim 2 wherein said donor compound is hexamethyl phosphoramide.

10. A process of claim 2 wherein said electron donor is a liquid and contains from 2 to 25 weight percent water and said fluid is a gas, and wherein said gas is contacted with said liquid donor at a temperature within the range of from 0 to 200° F.

11. In the process of claim 10, said electron donor containing a saturation amount of water and also containing a liquid diluent, substantially water immiscible, in a mole ratio of said donor to said diluent of from 0.2:1 to 5:1 to thereby regulate the said saturation amount of water.

12. The process of claim 10 wherein said gas to be contacted with said liquid contains nitric oxide, and adding nitric acid to said liquid electron donor in an amount sufficient to maintain the said average oxidation state as described.

13. A process of claim 11 wherein said fluid contains from 0.1 to 10 volume percent of a mixture of nitrogen oxides of the above described class of nitrogen compounds.

14. In the process of claim 11 said electron donor being partially water immiscible.

15. A process of claim 4 wherein said diluent is a hydrocarbon liquid.

16. A process of claim 15 wherein the volume ratio of said tributyl phosphate to said hydrocarbon liquid is within the range of from 0.2:1 to 5:1.

17. The process of claim 14 wherein said donor compound is tributyl phosphate.

References Cited in the file of this patent

UNITED STATES PATENTS

| | | |
|---|---|---|
| 2,059,084 | Buchheim | Oct. 27, 1936 |
| 2,086,732 | Millar et al. | July 13, 1937 |
| 2,132,511 | Hentrich | Oct. 11, 1938 |

FOREIGN PATENTS

| | | |
|---|---|---|
| 267,874 | Germany | Nov. 27, 1912 |
| 483,706 | Great Britain | Apr. 21, 1938 |

OTHER REFERENCES

Mellor: "A Comprehensive Treatise on Inorganic and Theoretical Chemistry," Longmans, Green and Co., New York, N.Y., vol. 8, 1928, page 393.

Webb: "Absorption of Nitrous Gases," Longmans, Green & Co., New York, N.Y., 1923, page 120.

UNITED STATES PATENT OFFICE
CERTIFICATE OF CORRECTION

Patent No. 3,044,844                                    July 17, 1962

Lucien G. Maury et al.

It is hereby certified that error appears in the above numbered patent requiring correction and that the said Letters Patent should read as corrected below.

In the heading to the drawings, Sheets 1 to 7, lines 2 and 3, and in the heading to the printed specification, lines 2 and 3, title of invention, for "METHOD OF REMOVING NITROGEN OXIDES FROM FLUIDS AND NITROUS ACID", each occurrence, read -- METHOD OF REMOVING NITROGEN OXIDES AND NITROUS ACID FROM FLUIDS --; columns 5 and 6, Table 1, Run No. 3, column "C", for "2.05" read -- 3.05 --; same Table 1, Run No. 6, column "E", for "960" read -- 96 --; column 6, line 64, for "a least" read -- at least --; column 13, line 25, for "compunds" read -- compounds --.

Signed and sealed this 20th day of November 1962.

(SEAL)
Attest:
ERNEST W. SWIDER                                             DAVID L. LADD
Attesting Officer                                         Commissioner of Patents